United States Patent
Ye et al.

(10) Patent No.: US 12,200,622 B2
(45) Date of Patent: Jan. 14, 2025

(54) POWER SAVING FOR USER EQUIPMENT THROUGH SIDELINK RESOURCE ALLOCATION

(71) Applicant: Apple Inc., Cupertino, CA (US)

(72) Inventors: Chunxuan Ye, San Diego, CA (US); Chunhai Yao, Beijing (CN); Dawei Zhang, Saratoga, CA (US); Haitong Sun, Irvine, CA (US); Hong He, Cupertino, CA (US); Huaning Niu, San Jose, CA (US); Jia Tang, San Jose, CA (US); Oghenekome Oteri, San Diego, CA (US); Sigen Ye, Whitehouse Station, NJ (US); Wei Zeng, San Diego, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 469 days.

(21) Appl. No.: 17/438,669

(22) PCT Filed: Oct. 21, 2020

(86) PCT No.: PCT/CN2020/122457
§ 371 (c)(1),
(2) Date: Sep. 13, 2021

(87) PCT Pub. No.: WO2022/082501
PCT Pub. Date: Apr. 28, 2022

(65) Prior Publication Data
US 2022/0322229 A1    Oct. 6, 2022

(51) Int. Cl.
*H04W 4/00* (2018.01)
*H04W 52/02* (2009.01)

(52) U.S. Cl.
CPC ... *H04W 52/0216* (2013.01); *H04W 52/0225* (2013.01)

(58) Field of Classification Search
CPC ......... H04W 52/0216; H04W 52/0225; H04W 72/542; H04W 76/14
See application file for complete search history.

(56) References Cited

U.S. PATENT DOCUMENTS

| 2020/0221423 A1 | 7/2020 | Wang |
| 2020/0275411 A1 | 8/2020 | Tang |

(Continued)

FOREIGN PATENT DOCUMENTS

| CN | 107889219 | 4/2018 |
| CN | 109314876 | 2/2019 |

(Continued)

OTHER PUBLICATIONS

International Search Report for PCT Patent Application No. PCT/CN2020/122457; mailed Jun. 2, 2021.

(Continued)

*Primary Examiner* — Omoniyi Obayanju
(74) *Attorney, Agent, or Firm* — Kowert, Hood, Munyon, Rankin & Goetzel, P.C.

(57) ABSTRACT

A user equipment (UE) configured to determine a resource selection window which identifies a first set (e.g., a total set) of candidate resources. The UE may then remove one or more candidate resources from the first set of candidate resources in response to receiving sidelink control information (SCI) from a pedestrian UE with a reservation of the one or more first candidate resources. After removal of these candidate resources from the initial or first set based on their presumed unavailability, the result may be a second set of candidate resources, which may be a subset of the initial or first set for use in communicating with a third UE. The UE may also be configured to remove candidate resources based on a reference signal receive power (RSRP) threshold which can also be adjusted based on a maximum value or a highest priority of the pedestrian UE's data.

20 Claims, 6 Drawing Sheets

(56) References Cited

U.S. PATENT DOCUMENTS

| | | |
|---|---|---|
| 2020/0280961 A1 | 9/2020 | Lee et al. |
| 2022/0078758 A1* | 3/2022 | Lee .................. H04W 72/1263 |
| 2023/0063943 A1* | 3/2023 | Ding ..................... H04W 72/02 |

FOREIGN PATENT DOCUMENTS

| | | | | |
|---|---|---|---|---|
| EP | 4138451 | | 2/2023 | |
| EP | 4195809 | | 6/2023 | |
| WO | WO-2018145067 A1 * | 8/2018 | ........... H04B 17/318 |

OTHER PUBLICATIONS

Fraunhoffer HHI et al. "Resource Allocation Enhancements for Mode 2"; 3GPP TSG RAN WG1 Meeting #102-e R1-2005537; e-Meeting; Aug. 17-28, 2020.

NTT Docomo, Inc. "Discussion on details of pedestrian UE partial sensing"; 3GPP TSG RAN WG1 meeting #86bis R1-1610035; Lisbon, Portugal; Oct. 10-14, 2016.

Extended European Search Report for EP Patent Application No. 20958084.4; May 23, 2024.

Huawei et al. "Discussion on the necessity of differentiating P-UE and V-UE"; 3GPP TSG RAN WG1 Meeting #88 R1-1701771; Feb. 13, 2017.

Office Action for CN Application No. 202080106528.0; Nov. 27, 2024.

* cited by examiner

POWER SAVING FOR USER EQUIPMENT THROUGH SIDELINK RESOURCE ALLOCATION

PRIORITY CLAIM INFORMATION

This application is a national stage application of International Application No. PCT/CN2020/122457, filed on Oct. 21, 2020, titled "Power Saving for User Equipment Through Sidelink Resource Allocation", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to an apparatus, system, and method for allocating sidelink resources when communicating with wireless devices that have low power capabilities in order to reduce latency and power consumption and enhance reliability.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance.

The increased communication requirements of certain V2X systems may strain the power and resource capabilities of portable, battery-powered UE devices. In addition, some UEs are more power limited than others and communicating with a host of UEs may present decreased battery life, increased latency, and degraded communication issues. Accordingly, improvements in the field would be desirable.

SUMMARY

Embodiments are presented herein of apparatuses, systems, and methods for a wireless device to allocate sidelink resources based on the existence of or interactions with other wireless devices with varying power capabilities in order to reduce latency and power consumption and enhance reliability.

Some embodiments relate to a user equipment (UE), comprising at least one antenna, a radio operably coupled to the at least one antenna, and a processor operably coupled to the radio. The UE may be comprised in a vehicle, e.g., may be a vehicular UE (VUE). When the UE is communicating with a pedestrian UE, the UE may perform additional steps in its resource allocation scheme, based on the assumption that the pedestrian UE will perform a more limited type of sensing due to its power restrictions. In other words, given the presence of a power restricted pedestrian UE, the UE (e.g., the vehicular UE) may perform additional steps to decrease the likelihood of resource conflicts.

First, the UE may be configured to determine a resource selection window which identifies a first set (e.g., a total set) of candidate resources. The UE may then remove one or more candidate resources from the first set of candidate resources based on various criteria. For example, some candidate resources may be removed or excluded in response to receiving sidelink control information (SCI) from a pedestrian UE with a reservation of the one or more first candidate resources. Candidate resources may also be removed for various other reasons as well. After removal of these candidate resources from the initial or first set based on their presumed unavailability, the result may be a second set of candidate resources, which may be a subset of the initial or first set. The UE may then use the second set of candidate resources in communicating with other UEs.

Moreover, the UE may be further configured to perform a reference signal receive power (RSRP) measurement on the one or more first candidate resources using a specified RSRP threshold. Additionally, the UE may be further configured to increase the RSRP threshold if the number of the second set of candidate resources is less than the percentage of the first set of candidate resources. Furthermore, in some embodiments, the UE may be further configured to increase the RSRP threshold up to a maximum value or determine the RSRP threshold based at least in part on a highest priority of the pedestrian UE's data. In other aspects, the UE may also be configured to remove the one or more first candidate resources from the first set of candidate resources regardless of any reference signal receive power (RSRP) measurement.

In other embodiments, the UE may be further configured to determine that the third UE is a pedestrian UE based at least in part on sidelink control information (SCI) received from the pedestrian UE that includes at least one bit having a value that indicates a pedestrian UE.

In some embodiments, the UE may be further configured to determine that the third UE is a vehicular UE based at least in part on sidelink control information (SCI) received from the vehicular UE that includes at least one bit having a value that indicates a vehicular UE.

Moreover, in other aspects, the UE may be further configured to re-evaluate a first set of candidate resources based at least in part on determining that at least one of the first set of candidate resources was not in the second set of candidate resources or report pre-emption if any self-reserved resources are not in the second set of candidate resources due to a conflict with a higher data priority pedestrian UE's reservation.

Some embodiments may relate to a user equipment (UE) device having at least one antenna for performing wireless communications, a radio, and a processing element coupled to the radio. The UE may perform at least some of the methods described herein.

Some embodiments relate to a baseband processor having processing circuitry configured to perform at least a portion or all of the above operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
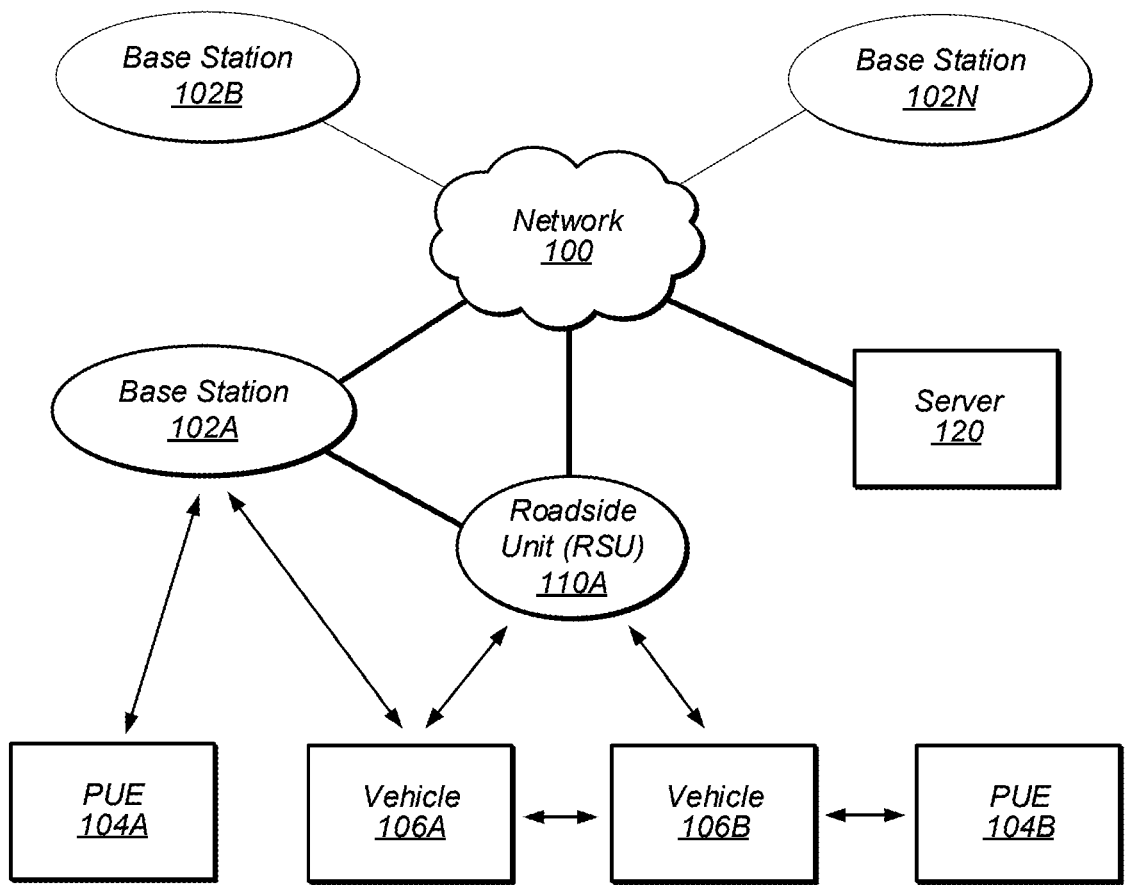
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio.
NR-U: NR Unlicensed
TX: Transmission/Transmit
RX: Reception/Receive
RAT: Radio Access Technology
DCI: Downlink Control Information
V2X: Vehicle to Everything
PSCCH: Physical Sidelink Control Channel
PSSCH: Physical Sidelink Shared Channel
PUCCH: Physical Uplink Control Channel
RSRP: Reference Signal Received Power
PUE: Pedestrian User Equipment
VUE: Vehicle User Equipment
QoS: Quality of Service
PDB: Packet Delay Budget.
SCI: Sidelink Control Information The following is a glossary of terms used in this disclosure:

Memory Medium—Any of various types of non-transitory memory devices or storage devices. The term "memory medium" is intended to include an installation medium, e.g., a CD-ROM, floppy disks, or tape device: a computer system memory or random-access memory such as DRAM, DDR RAM, SRAM, EDO RAM, Rambus RAM, etc.; a non-volatile memory such as a Flash, magnetic media, e.g., a hard drive, or optical storage: registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems devices which are mobile or portable and which perform wireless communications. Examples of UE devices include mobile telephones or smartphones (e.g., iPhone™, Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles. Examples of pedestrian UEs include smart phones, wearable UEs, PDAs, etc.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

FIGS. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, and as defined above, the term "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing the wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUES.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V. HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE and/or 5G NR embodiments. In some embodiments, the PC5 interface supports direct cellular communication between user devices (e.g., between vehicles 106), while the Uu interface supports cellular communications with infrastructure devices such as base stations. The PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. Some user devices in a V2X system, e.g., PUE 104A, may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an 'eNodeB', or eNB whereas if the base station 102A is implemented in the context of 5G NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may also be capable of communicating with the base station 102A. The user devices shown, i.e., user devices 104A, 104B, 106A, and 106B may also be capable of receiving signals from (and may possibly be within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are of course also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, 5G NR etc.), and/or other wireless communication protocols. In some embodiments, RSU 110A may be able to communicate with devices using a "sidelink" technology such as PC5.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
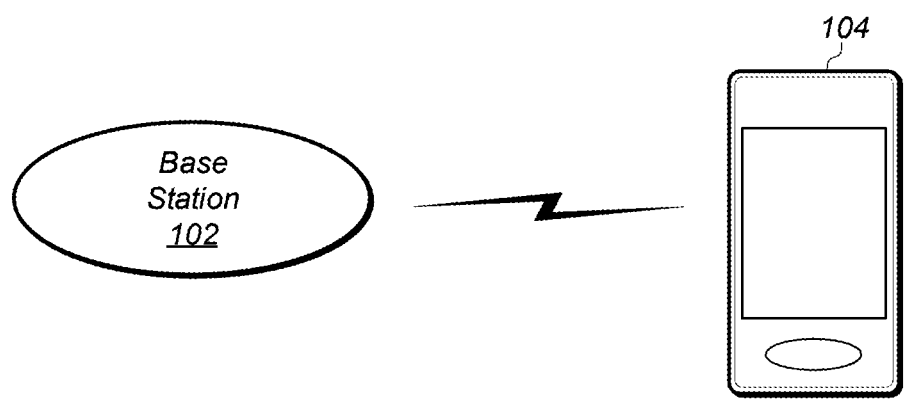
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array) that is configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1xRTT/1xEV-DO/HRPD/eHRPD) LTE, and/or 5G NR using a single shared radio and/or 5G NR or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using any of LTE, 5G NR, and/or 1xRTT (or LTE or GSM), and separate radios for communicating using each of Wi-Fi and Bluetooth. Other configurations are also possible.

Figure 3:
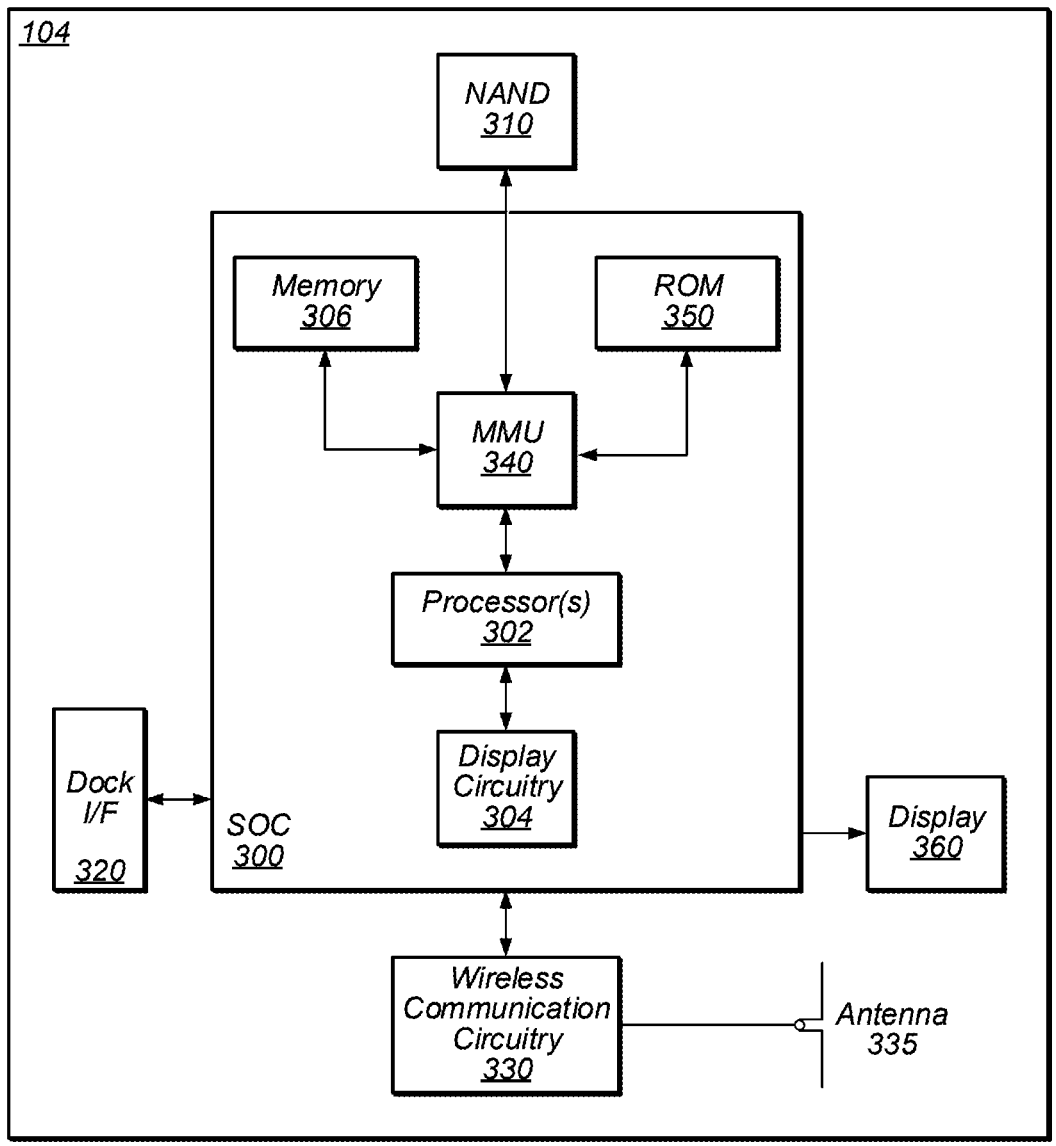
FIG. 3 is an example block diagram of a UE, according to some embodiments.

FIG. 3—UE Block Diagram

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing more efficient vehicle-related communication, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
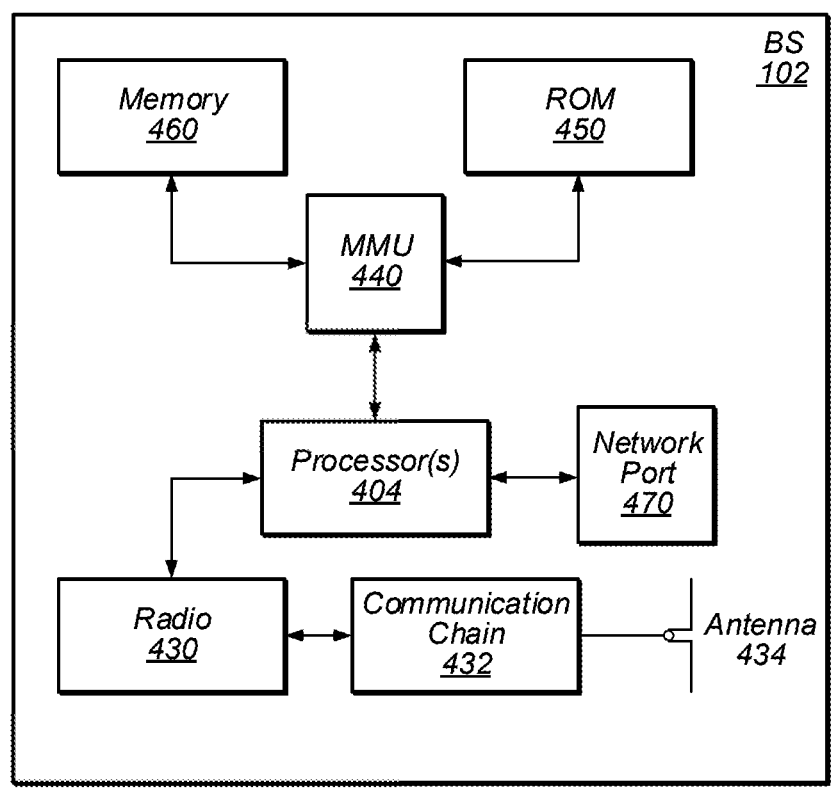
FIG. 4 is an example block diagram of a base station, according to some embodiments.

FIG. 4—Base Station Block Diagram

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New: Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another example, the base station 102 may include a 5G NR radio for performing communication according to 5G NR as well as a Wi-Fi radio for performing communication according to Wi-Fi. In such a case, the base station 102 may be capable of operating as both 5G NR base station and a Wi-Fi access point. As a further possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
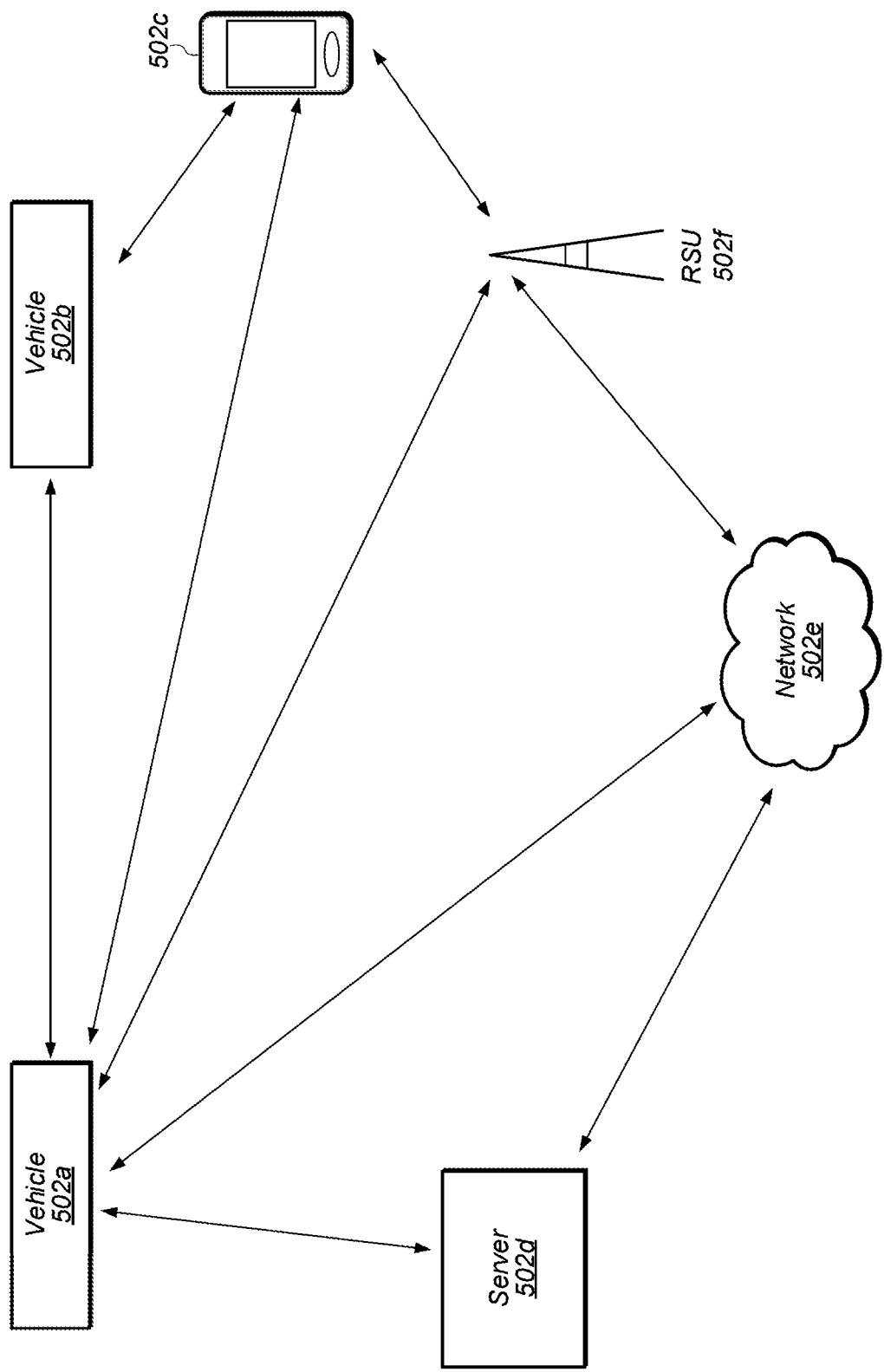
FIG. 5 illustrates an example of a vehicle-to-everything network, according to some embodiments.

FIG. 5—Sidelink Resource Management

As noted above, certain user devices (or UE devices) may be able to conduct communications with one another directly, i.e., without an intermediary infrastructure device such as base station 102A or RSU 110A. This direct communication between two wireless devices, such as between two vehicles, or between a vehicle UE and a pedestrian UE, is referred to as sidelink communication. Stated another way, two UE devices performing peer-to-peer (direct) communications with each other may each utilize a "sidelink" interface and may be said to be communicating over a sidelink channel.

In some existing implementations, a listen before talk (LBT) mechanism may be used to access the shared medium (e.g., such as unlicensed bands commonly used for Wi-Fi, Bluetooth, and other short to medium range communications, e.g., non-3GGP access) during sidelink communications to avoid collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

In some implementations, in order to avoid collisions a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

As an example, vehicle-to-everything (V2X) communications, e.g., as specified by 3GPP TS 22.185 V.14.3.0, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 5, a vehicle, such as vehicle 502a, may communicate with various devices (e.g., devices 502b-f), such as road side units (RSUs), infrastructure (V2I), network (V2N), pedestrian (V2P), and/or other vehicles (V2V). In addition, as shown, various devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHZ. Moreover, V2X communications may include uni-cast, multi-cast, groupcast, and/or broadcast communications. Each communication type may employ an LBT mechanism.

As described above, under the V2X communication protocol a transmitter may reserve periodic slots within a reservation period. More specifically, in order to help prevent collisions on the shared sidelink channel, the various UEs in a network (e.g., a V2X network) may perform sidelink resource management for both network assisted resource management and autonomous (e.g., non-network assisted) resource management. In other words, the various UE devices may operate to determine or schedule the use of sidelink resources for transmissions to other UEs. In some embodiments, a UE. such as UE 106, may originate a semi-persistent sidelink schedule for a resource. A UE may broadcast a resource occupancy message (RO message) periodically. The RO message may include resource blocks (RBs) and/or sub-frames to be used (scheduled), a periodicity of resource occupancy (e.g., reservation), and/or, a time remaining for the resource occupancy (e.g., reservation). In addition, in some embodiments, a maximum allowed channel occupancy time (T_max_COT) may be defined. In such embodiments, an initial remaining time of the resource occupancy may not exceed the maximum allowed channel occupancy time. In other words, the resource occupancy may only be for a time less than the maximum allowed channel occupancy time.

In some embodiments, when a UE enters a new system (e.g., a new set of UEs and/or a new location), the UE may sense (listen) to a channel to collect existing UEs RO messages to determine available resources in the new system. In other words, prior to transmitting a RO message when entering a new set of UEs/area (e.g., a set of UEs with proximity for sidelink communications), the UE may determine available resources via reception of RO messages from neighboring UEs. In some embodiments, upon expiration of a resource occupancy, a UE, prior to transmitting a new RO message, may determine available resources via reception of RO messages from neighboring UEs.

Power Saving for User Equipment Through
Sidelink Resource Allocation

In some existing implementations, 5G NR V2X may include various scheduling modes. For example, 5G NR V2X mode 2 may be designed for UE self-determination of sidelink transmission resources. 5G NR V2X mode 2 includes various sub-modes, including:
  Mode 2(a) in which a user equipment device (UE) autonomously selects sidelink resources for transmission;
  Mode 2(b) in which a UE assists sidelink resource selection for other UE(s);
  Mode 2(c) in which a UE is configured with NR configured grants (e.g., network defined semi-persistent grants) for sidelink transmission; and
  Mode 2 (d) in which a UE schedules sidelink transmissions of other UEs.

In addition, due to the periodic nature of V2X messaging, existing implementations of V2X may support semi-persistent scheduling (SPS), e.g., configured grant(s). For example, semi-persistent resources in SPS may represent timely repeated resources across a set of discontinuous sub-frames with a certain repetition periodicity. Semi-persistent resources may be scheduled across a set of discontinuous sub-frames with a sub-frame repetition period. Further, existing implementations of SPS (e.g., LTE V2X) and its corresponding resource allocation design are optimized for broadcast service. However, 5G NR V2X mode 2 additionally supports both unicast and groupcast services. Thus, there is a strong need to enhance methods that aid semi-persistent resource allocation for unicast service and groupcast service in 5G NR V2X mode 2.

In NR V2X R16, both Mode 1 and Mode 2 resource allocation schemes may be supported. The Mode 2 resource allocation scheme may involve the transmitting UE selecting the sidelink transmission resources based on its own sensing and resource selection procedure. In Rel-17 sidelink enhancement, the objective is to specify resource allocation by introducing the principle of Rel-14 LTE sidelink random resource selection and partial sensing to Rel-16 NR sidelink resource allocation Mode 2.

As noted above, when using Mode 2, some UEs may need to periodically perform sensing operations on the sidelink channel with a relatively high frequency in order to identify and utilize the potential resources of other UEs for sidelink communication. Such active sensing may consume device resources, e.g., power, at a relatively high rate. However, the option to reduce the sensing operations to a state of partial sensing (such as the UE only monitoring a subset of the subframes it is receiving) still consumes energy. Even further, the option to perform no sensing (e.g. random resource selection) may have a high resource collision probability.

In some embodiments, resource allocation of pedestrian user equipment (PUE) or other power restricted UEs may be based on no sensing or partial sensing in which the resources may be randomly allocated. On the other hand, for less power restricted UEs such as vehicle user equipment (VUE), full sensing may be assumed. However, in order to efficiently allocate resources, the less power restricted VUE may need to be aware of the existence of a PUE. Moreover, when a VUE is allocating resources, it may be beneficial in considering the resources reserved by both the VUE and PUE. More specifically, the resources reserved by a VUE and PUE may be handled differently considering their power restrictions or even processing capabilities. For example, a PUE may not perform sensing or may perform partial sensing in addition to not supporting a pre-emption check. In this example, the PUE is unlikely to evaluate the reserved resources due to lack of sensing (for power saving purposes). Additionally, the chance of collision of resource symbols in transmission/reception may be considerably higher if selecting resources reserved by a PUE.

During operation, the VUE may receive signaling from a UE identifying the UE as a PUE. As noted above, when the less power restricted UE (a vehicular UE) determines that some resources are reserved by a pedestrian UE (which is relatively more power restricted), the UE may perform additional steps in its resource allocation scheme. This is based on the assumption that the pedestrian UE will perform a more limited type of sensing due to its power restrictions. In other words, given the presence of a power restricted pedestrian UE, the UE (e.g., the vehicular UE) may perform additional steps to decrease the likelihood of resource conflicts. This operation is described below with reference to FIGS. 6 and 7. Furthermore, the VUE may perform additional preemption or reevaluation operations regarding how it will allocate resources based on the presence of a PUE. Accordingly, embodiments described herein contemplate a higher-powered UE, such as a VUE, which takes into account the presence of a lower powered UE, such as a PUE, when formulating resource allocation schemes.

Figure 6:
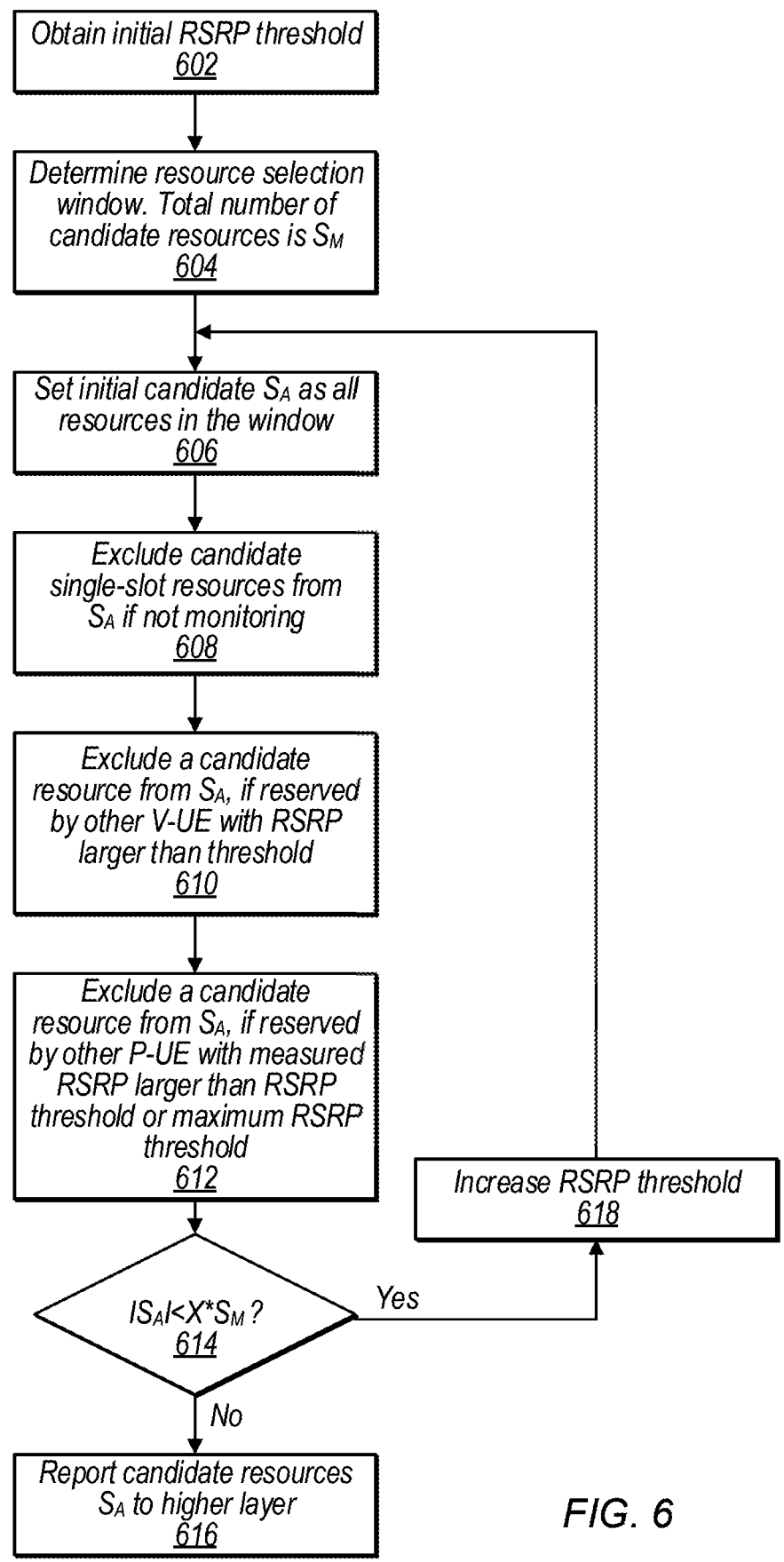
FIG. 6 illustrates a VUE candidate resource allocation procedure based on RSRP requirement, according to some embodiments.

FIG. 6—VUE Candidate Resource Allocation
Procedure Based on RSRP Requirement FIG. 6 illustrates some embodiments of a VUE's resource allocation scheme which factors in the presence of a lower powered UE. More specifically, FIG. 6 shows a VUE's candidate resource identification and exclusion procedure based on a comparison of other PUE RSRP values with a determined RSRP threshold.

First, in step 602, the VUE may obtain an initial reference signal received power (RSRP) threshold. The RSRP threshold value may correspond to a measurement of the average power received from a single reference signal typically in the range of −44 dBm to −140 dBm and with a resolution of 1 dBm. In other words, in a current implementation the RSRP is the received power spread over the full bandwidth and narrowband and is a key measure of signal level and quality for modern LTE and 5G NR networks. For example, when a PUE moves from one cell to another cell in a network, the PUE may measure the signal strength and/or quality of the neighboring cells in order to perform cell selection or reselection and handover.

The VUE may also measure the RSRP of a transmission corresponding to an SCI received from the PUE. The measurement may be based on either PSCCH (control channel) DMRS or PSSCH (data channel) DMRS. This RSRP measurement and SCI decoding may be part of the sensing procedure. In some aspects, the RSRP measurement may be for an existing transmission, while the measured value may be used as an estimation for the reserved resource. In doing so, the VUE may be able to determine an initial RSRP threshold based at least in part on the Quality of Service (QOS) of the sidelink data to be transmitted from the VUE.

Next, in step 604, the VUE may determine a resource selection window and a total number of candidate resources as $S_M$. The resource selection window may be determined based on the PDB (packet delay budget) of a data to be transmitted and/or may be pre-configured or configured per resource pool or configured by PC5-RRC. Stated another way, after the VUE receives the reference signal transmission from the PUE, the VUE is able to determine a certain number of candidate resources $S_M$ based at least in part on the resource selection window.

In step 606, the VUE may set the initial number candidate resource $S_A$ as all resources in the window. In doing so, the VUE has essentially determined that all resources in the resource selection window are initially identified as candidate resources. In other words, the VUE has set $S_A$ equal to $S_M$.

In steps 608, 610 and 612 the UE may remove or exclude resources from the initial or total set of candidate resources, based on a determination that these removed or excluded resources are likely to already be in use.

In step 608, the VUE may exclude candidate single-slot resources from $S_A$ if the VUE has not performed monitoring operations within a sensing window. In effect, because the VUE has not monitored the slots during the sensing window, the VUE may not know the resource reservation status of the slots in the resource selection window. In other words, the VUE will exclude candidate resources from $S_A$ if the VUE was not sensing during the resource monitoring window and the configured resource reservation corresponds to a time period before the candidate slot (i.e. outside of the resource monitoring window).

Next, in step 610, the VUE may then exclude a candidate resource from $S_A$ if the resource is reserved by another VUE with a RSRP larger than the determined RSRP threshold value. For example, if two VUEs are attempting to communicate and reserve certain sidelink resources with the same PUE, the VUE with the best signal quality or data priority level will have priority to reserve or retain that particular sidelink resource due to its superior wireless connection with the PUE. In other words, the VUE with the inferior signal quality or data priority will not interfere with the sidelink resource allocation of a better performing VUE-PUE pair. This being the case, the VUE will remove that particular candidate resource from the initial number of candidate resources $S_A$ in order to not interfere with the other VUE's sidelink communications with the PUE.

Moving to step 612, the VUE may then exclude a candidate resource from $S_A$ if the resource is reserved by another PUE with a measured RSRP value larger than the RSRP threshold value or a maximum RSRP threshold value. Similar to step 610, if the PUE that the VUE is attempting to communicate and reserve certain sidelink resources with is communicating with another UE, the PUE with the best signal quality or data priority level will have priority to reserve or retain that particular sidelink resource due to its superior wireless connection with the PUE. In other words, the VUE will not interfere with the sidelink resource allocation of a better performing PUE-PUE or PUE-VUE pair. This being the case, the VUE will remove that particular candidate resource from the initial number of candidate resources $S_A$ in order to not interfere with the other PUE's sidelink communications with the PUE. Additionally, in some aspects, the VUE may apply a maximum RSRP threshold for this step. For example, after a number of iterations have been performed (see step 618 below) in which the RSRP threshold is increased, the RSRP threshold may approach a maximum value with which to apply to this step. However, in some embodiments, certain VUE reserved resources may not have a maximum RSRP threshold. Furthermore, in other aspects, the priority of the PUE's data may be assumed to be the highest priority. In other words, the RSRP threshold may be determined based on the highest priority of the PUE's data. In other embodiments, combinations of separate, maximum, or highest priority based RSRP comparisons may be implemented in order for the VUE to determine which candidate resources to exclude.

In step 614, the VUE determines if $|S_A|<X*S_M$. In other words, the VUE determines if the absolute value of the number candidate resources $S_A$ is less than the product of the total number of candidate resources $S_M$ and X where X may be a percentage value corresponding to a fraction of the total number of candidate resources $S_M$. In some embodiments, the possible values of X may be configured to be 20%, 35%, or 50%. In other words, the VUE determines if the current set of candidate resources $S_A$ (having possibly excluded some resources according to the described steps above) is less than a specified percentage of the total number of candidate resources $S_M$. This product of the total number of candidate resources $S_M$ and X may correspond to a minimum number of candidate resources needed before reporting said resources to a higher layer for sidelink communications.

Having determined that the number of candidate resources $S_A$ is more than the specified percentage of the total number of candidate resources ($X*S_M$), the VUE proceeds to step 616 in which the VUE reports the candidate resources $S_A$ to a higher layer. In other words, if the number of candidate resources meets or exceeds a specified percentage of the total resources available, the VUE may report this to the next higher layer. For example, the VUE may report this number of candidate resources to a higher layer for the purpose of initiating sidelink communications using one or more of these candidate resources based on random selection.

Conversely, having determined that the number of candidate resources $S_A$ is less than the product of the total number of candidate resources ($X*S_M$), the VUE proceeds to step 618 in which the VUE increases the RSRP threshold and proceeds back to step 606 in which the candidate resources $S_A$ are reset as all resources in the window. In other words, if the number of candidate resources does not meet a minimum requirement corresponding to a percentage of the total number of resources, the VUE may attempt to relax its RSRP requirement by increasing the RSRP threshold (typically increasing by approximately 3 dB per iteration) such that previously excluded candidate resources (due to exceeding the RSRP threshold) may not be excluded in the following iteration. In other embodiments, the RSRP threshold increase step per iteration may be different for a PUE and a VUE. More specifically, in some aspects, the RSRP threshold increase step per iteration for a VUE may be larger than the RSRP threshold increase step per iteration for a PUE. For example, a 3 dB increase may be applied to the RSRP threshold corresponding to a VUE's reserved resources per iteration, while a 1 dB increase may be applied to the RSRP threshold corresponding to a PUE's reserved resource per iteration. Therefore, after a certain number of iterations, once the number candidate resources $S_A$ is more than the specified percentage of the total number of candidate resources ($X*S_M$), the VUE may then proceed to step 616 in which the VUE reports the candidate resources $S_A$ to a higher layer.

Figure 7:
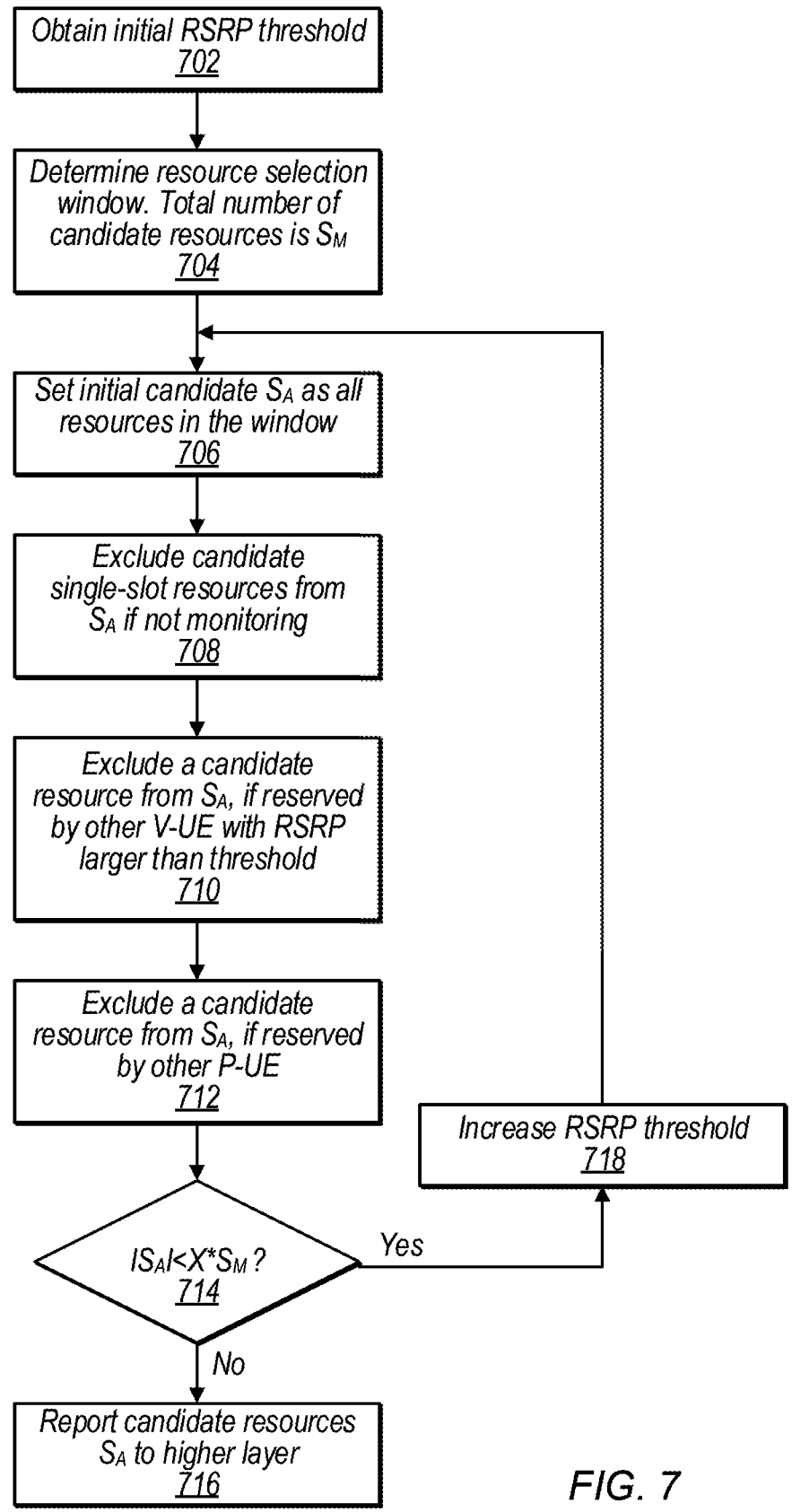
FIG. 7 illustrates a VUE candidate resource allocation procedure based on disregarding a RSRP requirement, according to some embodiments.

FIG. 7—VUE Candidate Resource Allocation Procedure Based on Disregarding RSRP Requirement FIG. 7 illustrates some embodiments of a VUE's candidate resource identification and exclusion procedure based on the principle in which if the VUE receives SCI from a PUE with a reservation of a candidate resource, the VUE may always exclude the candidate resource regardless of what the RSRP measurement may be.

First, in step 702, the VUE may obtain an initial RSRP threshold. As discussed above with regard to step 602, the VUE may also measure the RSRP of the transmission corresponding to an SCI received from the PUE. In some aspects, the RSRP measurement may be for an existing transmission, while the measured value may be used as an estimation for the reserved resource. In doing so, the VUE may be able to determine an initial RSRP threshold based at least in part on the Quality of Service (QOS) of the sidelink data to be transmitted from the PUE.

Next, in step 704, the VUE may determine a resource selection window and a total number of candidate resources as $S_M$. Similar to step 604 discussed above, the resource selection window may be determined based on the PDB (packet delay budget) of the data to be transmitted and/or may be pre-configured per resource pool or configured by PC5-RRC.

Proceeding to step 706, the VUE may set the initial number candidate resource $S_A$ as all resources in the window. In other words, the VUE has set $S_A$ equal to $S_M$ which essentially identifies all the resources in the monitoring window as candidate resources.

In step 708, the VUE may exclude candidate single-slot resources from $S_A$ if the VUE is not performing monitoring operations. For example, as discussed above with regard to step 608, the VUE may exclude candidate resources from $S_A$ if the VUE was not sensing during the resource monitoring window and the configured resource reservation corresponds to a time period before the candidate slot (i.e. outside of the resource monitoring window).

Next, in step 710, the VUE may exclude a candidate resource from $S_A$ if the resource is reserved by another VUE has a measured RSRP value higher than the RSRP threshold value. As discussed above with regard to step 610, the VUE with the inferior signal quality or data priority (lower RSRP) will attempt to not interfere with the sidelink resource allocation of a better performing VUE-PUE or VUE-VUE pair by excluding that particular candidate resource from the initial number of candidate resources $S_A$.

Moving to step 712, the VUE may then exclude a candidate resource from $S_A$ if the resource is reserved by another PUE. In this example, if the VUE receives SCI from a PUE with a reservation of a candidate resource, the VUE may always exclude the candidate resource regardless of what the RSRP measurement may be. In doing so, the PUE assumes the highest possible priority with regard to that particular candidate resource. In other words, without regard to the PUE's RSRP measured value, the VUE will not include candidate resources reserved by a PUE in the set of candidate resources to be delivered to a higher layer.

In step 714, the VUE determines if $|S_A|<X*S_M$. For example, the VUE may determine if the current set of candidate resources $S_A$ (having possibly excluded some resources according to the described steps above) is less than a specified percentage of the total number of candidate resources $S_M$.

In the scenario in which the number of candidate resources $S_A$ is more than the specified percentage of the total number of candidate resources ($X*S_M$), the VUE proceeds to step 716 in which the VUE may report this to the next higher layer for the purpose of initiating sidelink communications using these candidate resources.

Conversely, In the scenario in which the number of candidate resources $S_A$ is less than the product of the total number of candidate resources ($X*S_M$), the VUE may then proceed to step 718 in which the VUE increases the RSRP threshold and followed by restarting the procedure from step 706. Similar to step 618 discussed above, the VUE may attempt to relax its RSRP requirement by increasing the RSRP threshold such that previously excluded candidate resources may not be excluded in the following iteration. Therefore, after a certain number of iterations, once the number candidate resources $S_A$ is more than the specified percentage of the total number of candidate resources ($X*S_M$), the VUE may then proceed to step 716 in which the VUE reports the candidate resources $S_A$ to a higher layer.

VUE's Resource Re-Evaluation/Pre-Emption in Considering PUE

In some embodiments, a VUE may utilize re-evaluation or pre-emption in determining resources from a PUE. For example, when a VUE is given a selected/reserved set of resources ($r_0, r_1, r_2, \ldots$)/($r_0', r_1', r_2', \ldots$) and is following the resource selection procedures for identifying candidate resources as illustrated in FIGS. 6 and 7 above, an additional step may be implemented during the 610 and 710 steps. For example, a VUE may exclude candidate resources from $S_A$ if the UE receives SCI from a VUE with a reservation of the candidate resources and the RSRP measurement is higher than a RSRP threshold. Moreover, in some embodiments, the VUE may also exclude candidate resources from $S_A$ if the VUE receives SCI from a PUE with a reservation of the candidate resources, no matter what the RSRP measurement is. In doing so, the VUE is always able to avoid interference to any PUE's reservation.

Furthermore, the VUE may report pre-emption if any self-reserved resources ($r_0', r_1', r_2', \ldots$) are not in $S_A$ due to a conflict with a VUE's reservation and self-reserved resources associated with data priority $prio_{TX}$, other UE's reserved resources associated with data priority $prior_{RX}$, and a pre-configured priority level $prio_{pre}$ which satisfies $prior_{RX}<prio_{TX}$ and $prior_{RX}<prio_{pre}$. In other embodiments, the VUE may report pre-emption if any self-reserved resources ($r_0'$, $r_1'$, $r_2'$, ... ) are not in $S_A$ due to a conflict with a PUE's reservation.

SCI Signaling Related to PUE Resource Reservation

In other aspects, a PUE's resource reservation may be related to SCI signaling. For example, when a VUE needs to distinguish which resources are reserved by a PUE and which resources are reserved by a VUE, the VUE requires an indication of a UE's resource allocation type. In some aspects, the UE's resource allocation type may be implicitly indicated to always use the highest QoS level for the data transmitted by a PUE. In other aspects, the PUE's resource allocation type may be indicated by a single bit in SCI stage 1 (e.g., SCI format 1-A) so as to indicate that the resource reservation is from a PUE. In other words, the PUE's resource reservation information may be included in SCI. Moreover, in another embodiment, multiple bits in SCI may be used to indicate that the resource reservation is from a PUE with different levels.

Furthermore, a UE's resource allocation type may be indicated according to different schemes a PUE uses to obtain said resources. For example, in some embodiments, the PUE may obtain resources based on random selection, partial sensing, additional short full sensing, or inter-UE coordination. In other aspects, a UE's resource allocation type may be indicated based on whether the PUE is able to perform re-evaluation or pre-emption checks. In other aspects, a UE's resource allocation type may be indicated through a combination of obtaining resources based on random selection, partial sensing, additional short full sensing, or inter-UE coordination and whether the PUE is able to perform re-evaluation or pre-emption checks.

Moreover, a PUE's resource allocation type may be indicated through signaling. For example, SCI stage 1 (i.e. SCI format 1-A) may be used to indicate a PUE's resource allocation type using one or more reserved bits in SCI stage 1. In other words, a PUE's resource reservation information may be at least partially comprised in SCI. In some embodiments, a value of 1 may indicate a PUE and a value of 0 may indicate a VUE. Alternatively, in some embodiments, SCI stage 2 (i.e. SCI format 2-A, 2-B, or 2-C) may be used to indicate a UE's resource allocation type.

PUE's Resource Allocation with Partial Sensing

In some embodiments, a PUE may allocate resources while performing partial sensing operations. For example, when following the resource selection procedures for identifying candidate resources as illustrated in FIGS. 6 and 7 above, an additional step may be implemented during the 610 and 710 steps. For example, a PUE may exclude candidate resources from $S_A$ if the PUE receives an SCI from a VUE with a reservation of candidate resources, the RSRP measurement is higher than the RSRP threshold, the priority of the PUE's data is assumed to be the highest priority, and the RSRP threshold is determined based on the highest priority of the PUE's data.

Furthermore, in some aspects, the PUE's identified candidate resources may be less that the VUE's identified candidate resources. For example, the PUE's configured X % candidate resources may be less than the configured X % candidate resources for the VUE. In other aspects, the PUE's configured X % candidate resources may be the same as the configured X % candidate resources for the VUE with the exception of additional ranking and filtering. Furthermore, the X % candidate resources may be ranked based on measured RSRP values. In some embodiments, smaller RSRP values may correspond to a higher rank. Moreover, the identified candidate resources may be fixed percentage (e.g. Y %, where Y is less than or equal to X) or a fixed value (e.g., Z) of candidate resources of the higher rank.

PUE's Resource Pre-Emption

According to some embodiments, a PUE may report pre-emption if any self-reserved resources from the set of resources ($r_0'$, $r_1'$, $r_2'$, ... ) are not in the initial set of resources $S_A$ due to a conflict with another PUE's reservation and self-reserved resources associated with data priority $prio_{TX}$, other PUE's reserved resources associated with data priority $prior_{RX}$, or a pre-configured priority level $prio_{pre}$ which satisfy $prior_{RX}<prio_{TX}$ and $prior_{RX}<prio_{pre}$. For example, if there are insufficient resources available to grant a request, pre-emption may be used to allocate resources to higher priority transmissions. Furthermore, when pre-emption is employed, an existing transmission could lose a set of resources ($r_0'$, $r_1'$, $r_2'$, ... ) already assigned to it in favor of a request from a higher priority transmission. In particular, pre-emption and the re-allocation of resources based on higher priority transmissions is especially relevant in congested network conditions in which the resources requested by a number of devices must be distributed in a prioritized fashion which results in some UEs experiencing enhanced communications while others experience degraded communications.

In other aspects, the PUE may not report pre-emption if any of the self-reserved resources ($r_0'$, $r_1'$, $r_2'$, ... ) are not in the initial set of resources $S_A$ due to a conflict with a VUE's reservation.

Further embodiments of the invention are described below in the following paragraphs:

Some embodiments may relate to a user equipment (UE) device having at least one antenna for performing wireless communications, a radio, and a processing element coupled to the radio. The UE may perform at least some of the methods described herein.

Some embodiments relate to a baseband processor having processing circuitry configured to perform at least a portion or all of the above operations.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, a baseband processor (for use in a user equipment (UE)) may be configured to determine a resource selection window which identifies a first set of candidate resources. Additionally or alternatively, the baseband processor may be further configured to remove one or more first candidate resources from the first set of candidate resources in response to receiving sidelink control information (SCI) from a second UE with a reservation of the one or more first candidate resources, wherein the second UE is a pedestrian UE. According to some embodiments, the removal may produce a second set of candidate resources, wherein the second set may be based on the first set of candidate resources and also may be based at least in part on the removal of the one or more first candidate resources Additionally or alternatively, the baseband processor and/or UE may be configured to use the second set of candidate resources in communicating with a third UE or other wireless device.

In some embodiments, the baseband processor may be further configured to increase the RSRP threshold up to a maximum value. Additionally or alternatively, the baseband processor may be configured to determine the RSRP threshold based at least in part on a highest priority of the second UE's data. According to some embodiments, the baseband processor may be configured to remove the one or more first candidate resources from the first set of candidate resources regardless of any reference signal receive power (RSRP) measurement. Additionally or alternatively, the baseband processor may be comprised in a vehicular UE and may be further configured to determine that the second UE is a pedestrian UE based on the sidelink control information (SCI). According to some embodiments, the sidelink control information (SCI) may include at least one bit having a value that indicates the pedestrian UE.

In some embodiments, the baseband processor may be comprised in a pedestrian UE and may be further configured to determine that the second UE is a vehicular UE based on the sidelink control information (SCI). Additionally or alternatively, the sidelink control information (SCI) may include at least one bit having a value that indicates the vehicular UE. According to some embodiments, the baseband processor may be further configured to re-evaluate a first set of candidate resources based at least in part on determining that at least one of the first set of candidate resources was not in the second set of candidate resources. Additionally or alternatively, the baseband processor may be further configured to report pre-emption if any self-reserved resources are not in the second set of candidate resources due to a conflict with a higher data priority pedestrian UE's reservation.

In some embodiments, the pedestrian UE's resource reservation information may be at least partially comprised in sidelink control information (SCI). Additionally or alternatively, the pedestrian UE's configured percentage of candidate resources may be less than or equal to a vehicular UE's configured percentage of candidate resources. According to some embodiments, the pedestrian UE's configured percentage of candidate resources may be ranked based at least in part on measured reference signal receive power (RSRP) values. Additionally or alternatively, smaller RSRP values may correspond to a higher rank.

What is claimed is:

1. A processor, comprising:
   memory storing instructions that, when executed, cause a first user equipment (UE) to:
   determine a resource selection window which identifies a first set of candidate resources;
   remove one or more first candidate resources from the first set of candidate resources in response to receiving sidelink control information (SCI) from a second UE with a reservation of the one or more first candidate resources, wherein the second UE is a pedestrian UE, wherein the removal produces a second set of candidate resources, and wherein the second set is based on the first set of candidate resources and also based at least in part on the removal of the one or more first candidate resources;
   perform a reference signal receive power (RSRP) measurement on the one or more first candidate resources using a RSRP threshold;
   determine if a number of the second set of candidate resources is less than a percentage of the first set of candidate resources;
   increase, as part of at least one iteration and in response to determining that the number of the second set of candidate resources is less than the percentage of the first set of candidate resources, the RSRP threshold, wherein the RSRP threshold is increased, as part of the at least one iteration and up to a maximum value, by a larger value when the first UE is a vehicular UE and by a smaller value when the first UE is a pedestrian UE; and
   use the second set of candidate resources in communicating with a third UE.

2. The processor of claim 1, wherein the instructions are further executable to cause the UE to determine the RSRP threshold based at least in part on a highest priority of data of the second UE.

3. The processor of claim 1, wherein the instructions are further executable to cause the first UE to remove the one or more first candidate resources from the first set of candidate resources regardless of any RSRP measurement.

4. The processor of claim 1,
   wherein the UE is a vehicular UE and the instructions are further executable to cause the first UE to determine that the second UE is a pedestrian UE based on the sidelink control information (SCI),
   wherein the SCI includes at least one bit having a value that indicates the pedestrian UE.

5. The processor of claim 1,
   wherein the UE is a pedestrian UE and the instructions are further executable to cause the first UE to determine that the second UE is a vehicular UE based on the SCI,
   wherein the SCI includes at least one bit having a value that indicates the vehicular UE.

6. A non-transitory computer readable storage medium storing program instructions executable by at least one processor to cause a first user equipment (UE) to:
   determine a resource selection window which identifies a first set of candidate resources;

remove one or more first candidate resources from the first set of candidate resources in response to receiving sidelink control information (SCI) from a second UE with a reservation of the one or more first candidate resources, wherein the second UE is a pedestrian UE, wherein the removal produces a second set of candidate resources, and wherein the second set is based on the first set of candidate resources and also based at least in part on the removal of the one or more first candidate resources;

perform a reference signal receive power (RSRP) measurement on the one or more first candidate resources using a RSRP threshold;

determine if a number of the second set of candidate resources is less than a percentage of the first set of candidate resources;

increase, as part of at least one iteration and in response to determining that the number of the second set of candidate resources is less than the percentage of the first set of candidate resources, the RSRP threshold, wherein the RSRP threshold is increased, as part of the at least one iteration and up to a maximum value, by a larger value when the first UE is a vehicular UE and by a smaller value when the first UE is a pedestrian UE; and use the second set of candidate resources in communicating with a third UE.

7. The non-transitory computer readable storage medium of claim 6,
wherein the instructions are further executable to cause the UE to re-evaluate the first set of candidate resources based at least in part on determining that at least one of the first set of candidate resources was not in the second set of candidate resources.

8. The non-transitory computer readable storage medium of claim 6,
wherein the instructions are further executable to cause the UE to report pre-emption if any self-reserved resources are not in the second set of candidate resources due to a conflict with a higher data priority pedestrian UE's reservation.

9. The non-transitory computer readable storage medium of claim 6,
wherein resource reservation information of the pedestrian UE is at least partially comprised in SCI.

10. The non-transitory computer readable storage medium of claim 6,
wherein a configured percentage of candidate resources of the pedestrian UE is less than or equal to a vehicular UE's configured percentage of candidate resources.

11. The non-transitory computer readable storage medium of claim 6,
wherein the configured percentage of candidate resources of the pedestrian UE is ranked based at least in part on measured RSRP values.

12. The non-transitory computer readable storage medium of claim 11,
wherein smaller RSRP values correspond to a higher rank.

13. A method, comprising:
by a first user equipment (UE):
determining a resource selection window which identifies a first set of candidate resources;

removing one or more first candidate resources from the first set of candidate resources in response to receiving sidelink control information (SCI) from a second UE with a reservation of the one or more first candidate resources, wherein the second UE is a pedestrian UE, wherein the removal produces a second set of candidate resources, and wherein the second set is based on the first set of candidate resources and also based at least in part on the removal of the one or more first candidate resources;

performing a reference signal receive power (RSRP) measurement on the one or more first candidate resources using a RSRP threshold;

determining if a number of the second set of candidate resources is less than a percentage of the first set of candidate resources;

increasing, as part of at least one iteration and in response to determining that the number of the second set of candidate resources is less than the percentage of the first set of candidate resources, the RSRP threshold, wherein the RSRP threshold is increased, as part of the at least one iteration and up to a maximum value, by a larger value when the first UE is vehicular UE and by a smaller value when the first UE is a pedestrian UE; and using the second set of candidate resources in communicating with a third UE.

14. The method of claim 13, further comprising:
determining the RSRP threshold based at least in part on a highest priority of data of the second UE.

15. The method of claim 13, further comprising:
re-evaluating the first set of candidate resources based at least in part on determining that at least one of the first set of candidate resources was not in the second set of candidate resources.

16. The method of claim 13, further comprising:
reporting pre-emption if any self-reserved resources are not in the second set of candidate resources due to a conflict with a higher data priority pedestrian UE's reservation.

17. The method of claim 13,
wherein resource reservation information of the pedestrian UE is at least partially comprised in SCI.

18. The method of claim 13,
wherein a configured percentage of candidate resources of the pedestrian UE is less than or equal to a vehicular UE's configured percentage of candidate resources.

19. The method of claim 13,
wherein a confiugred percentage of candidate resources of the pedestrian UE is ranked based at least in part on measured RSRP values.

20. The method of claim 19,
wherein smaller RSRP values correspond to a higher rank.

* * * * *